United States Patent
Brown et al.

(10) Patent No.: US 8,284,470 B2
(45) Date of Patent: Oct. 9, 2012

(54) SYSTEMS AND METHODS OF PROVIDING IMPROVED PERFORMANCE OF SCANNING MIRRORS COUPLED TO LIMITED ROTATION MOTORS

(75) Inventors: David C. Brown, Northborough, MA (US); Adam I. Pinard, Carlisle, MA (US)

(73) Assignee: Cambridge Technology, Inc., Lexington, MA (US)

(*) Notice: Subject to any disclaimer, the term of this patent is extended or adjusted under 35 U.S.C. 154(b) by 196 days.

(21) Appl. No.: 12/764,392

(22) Filed: Apr. 21, 2010

(65) Prior Publication Data

US 2010/0271679 A1    Oct. 28, 2010

Related U.S. Application Data

(60) Provisional application No. 61/171,952, filed on Apr. 23, 2009.

(51) Int. Cl.
*G02B 26/08* (2006.01)
(52) U.S. Cl. .................................... 359/198.1; 248/364
(58) Field of Classification Search .... 359/196.1–226.3, 359/227–236, 831–884; 248/648, 123.11, 248/162.1, 280.11, 334.1, 364; 49/99, 119, 49/150

See application file for complete search history.

(56) References Cited

U.S. PATENT DOCUMENTS

| | | |
|---|---|---|
| 4,936,307 A | 6/1990 | Saito et al. |
| 4,992,655 A | 2/1991 | Shelander |
| 5,066,084 A | 11/1991 | Culp |
| 5,097,356 A | 3/1992 | Paulsen |
| 5,212,523 A | 5/1993 | Ogaiwara et al. |
| 5,325,006 A | 6/1994 | Uno et al. |
| 5,493,161 A | 2/1996 | Uno et al. |
| 5,512,745 A | 4/1996 | Finer et al. |
| 5,528,027 A | 6/1996 | Mizutani |
| 5,536,926 A | 7/1996 | Ikeda et al. |
| 5,615,777 A | 4/1997 | Weichman et al. |
| 5,671,081 A | 9/1997 | Hisa |
| 5,769,544 A | 6/1998 | Suzuki et al. |

(Continued)

FOREIGN PATENT DOCUMENTS

EP    0583513    2/1994

(Continued)

OTHER PUBLICATIONS

International Search Report and Written Opinion issued on Nov. 3, 2011 for International Application No. PCT/US2010/031875, 7 pages.

*Primary Examiner* — Jennifer L. Doak
(74) *Attorney, Agent, or Firm* — Gesmer Updegrove LLP

(57) ABSTRACT

A mirror is disclosed for use in a limited rotation motor system, wherein the mirror includes a body, an aperture within the body, and a high density material within the aperture. The body, formed of one or more materials, has an exposed mirror surface and is mountable with the limited rotation motor system for rotation with respect to an axis of mirror rotation. The aperture is positioned at least proximate to a portion of the axis of mirror rotation. The high density material is provided within the aperture such that it is capable of movement within the aperture, and the high density material has a density that is greater than a density of the material of the body of the mirror.

20 Claims, 6 Drawing Sheets

U.S. PATENT DOCUMENTS

| | | |
|---|---|---|
| 5,774,207 A | 6/1998 | Yoshida et al. |
| 5,896,197 A | 4/1999 | Coffin |
| 6,002,506 A | 12/1999 | Suzuki et al. |
| 6,285,437 B1 | 9/2001 | Tokunaga |
| 6,483,530 B2 | 11/2002 | Wilson |
| 6,628,442 B1 | 9/2003 | DiFrancesco et al. |
| 6,650,357 B1 | 11/2003 | Richardson |
| 6,701,038 B2 | 3/2004 | Rensing et al. |
| 6,717,298 B2 | 4/2004 | Kitamura et al. |
| 6,831,744 B2 | 12/2004 | Masaki et al. |
| 6,879,747 B2 | 4/2005 | Ikegame |
| 7,107,601 B2 | 9/2006 | Arai |
| 7,286,273 B2 | 10/2007 | Ikegame |
| 7,304,105 B2 | 12/2007 | Kai et al. |
| 7,330,305 B2 | 2/2008 | Harris |
| 7,360,997 B2 | 4/2008 | Wagner et al. |
| 7,408,710 B2 * | 8/2008 | Chen et al. ............... 359/487.05 |
| 7,414,250 B1 | 8/2008 | Hersam et al. |
| 2002/0014709 A1 | 2/2002 | Arai |
| 2002/0164113 A1 | 11/2002 | Rensing et al. |
| 2004/0057817 A1 | 3/2004 | Hazelton |
| 2004/0085604 A1 | 5/2004 | Ikegame |
| 2005/0099611 A1 | 5/2005 | Sogard |
| 2005/0111122 A1 | 5/2005 | Pruyn |
| 2005/0174425 A1 | 8/2005 | Harris |
| 2006/0061008 A1 | 3/2006 | Karner et al. |
| 2006/0245022 A1 | 11/2006 | Lauer |
| 2007/0116340 A1 | 5/2007 | Beyrard |
| 2007/0229932 A1 | 10/2007 | Cho et al. |
| 2007/0235273 A1 | 10/2007 | Hadden et al. |
| 2008/0055390 A1 | 3/2008 | Klemer et al. |
| 2008/0055392 A1 | 3/2008 | Bush et al. |
| 2008/0170276 A1 | 7/2008 | Mamiya |
| 2008/0186555 A1 | 8/2008 | Nakatsu |
| 2009/0074462 A1 | 3/2009 | Yamazaki |

FOREIGN PATENT DOCUMENTS

| | | |
|---|---|---|
| EP | 0381983 | 5/1995 |
| EP | 0661660 | 7/1995 |
| EP | 0692726 | 1/1996 |
| EP | 0751402 | 6/1996 |
| EP | 0574565 | 3/1997 |
| EP | 1369733 | 12/2003 |
| EP | 1439208 | 7/2004 |
| EP | 1557817 A2 | 7/2005 |
| EP | 1757923 | 2/2007 |
| EP | 1557817 B1 | 5/2008 |
| GB | 2253112 | 8/1992 |
| GB | 2300275 | 10/1996 |
| JP | 55054742 | 4/1980 |
| JP | 55054742 A | 4/1980 |
| JP | 2002271136 | 11/1990 |
| JP | 200695257 | 4/1994 |
| JP | 200098241 | 4/2000 |
| JP | 2010227738 | 10/2010 |
| WO | WO9314373 | 7/1993 |
| WO | WO9527227 | 10/1995 |
| WO | WO2006124842 | 11/2006 |
| WO | WO2009024987 | 2/2009 |

* cited by examiner

SYSTEMS AND METHODS OF PROVIDING IMPROVED PERFORMANCE OF SCANNING MIRRORS COUPLED TO LIMITED ROTATION MOTORS

PRIORITY

The present application claims priority to U.S. Provisional Patent Application Ser. No. 61/171,952 filed Apr. 23, 2009, the disclosure of which is hereby incorporated by reference in its entirety.

BACKGROUND

The present invention generally relates to vibration reduction systems in limited rotation motor systems, and relates in particular to mirrors for use with high speed limited rotation motor systems such as galvanometer scanning systems.

In typical galvanometer scanning systems a mirror is mounted to the output shaft of a limited rotation motor and the limited rotation motor is controlled by a control loop that seeks to cause the rotor of the motor, and therefore the mirror, to follow a position and velocity command waveform with arbitrarily high fidelity.

There are limits, however, on the fidelity with which the system may follow the command. For example, the acceleration of the mirror within the system is limited by the rate of rise of current in the motor windings. The positional precision is limited by the signal to noise ratio of the feedback method. The bandwidth of the system (which is its ability to move from position A to position B at a desired high velocity and to then settle at position B precisely in the shortest possible time), is limited primarily by vibrations in the moving parts. The bandwidth of the system will nominally be ½ the first torsional resonance in the moving structure.

It is customary, therefore, to make the moving parts as stiff as possible within the constraints of the allowable system inertia. Since the torque required of the motor to reach a specified acceleration is directly proportional to the inertia and is proportional to the current (whose rate of rise is limited as noted above), it is often the case that when the system parameters are optimized for a particular inertia, some component, typically the mirror, even when made of a very high stiffness-to-inertia material, is not as stiff as is required to reach system bandwidth goals. In this case, extra material is added to the mirror to increase its stiffness, but, at the cost of additional inertia, requiring a larger, more expensive motor as well as a control loop that is capable of driving the additional inertia.

There is a need therefore, for a limited rotation motor system that provides improved bandwidth without requiring a larger, more expensive motor and accompanying control system.

SUMMARY

In accordance with an embodiment, the invention provides a mirror for use in a limited rotation motor system, wherein the mirror includes a body, an aperture within the body, and a high density material within the aperture. The body, formed of one or more materials, has an exposed mirror surface and is mountable with the limited rotation motor system for rotation with respect to an axis of mirror rotation. The aperture is positioned at least proximate to a portion of the axis of mirror rotation. The high density material is provided within the aperture such that it is capable of movement within the aperture, and the high density material has a density that is greater than a density of the material of the body of the mirror.

In accordance with another embodiment, the invention provides a scanning system including a limited rotation motor coupled to a mirror. The limited rotation motor includes a rotor shaft, and the mirror includes a body and a high density material within an aperture in the body. The body includes an exposed mirror surface and is coupled to the rotor shaft for rotation with respect to an axis of minor rotation. The high density material is capable of movement within said aperture with respect to the body of the mirror, and the high density material has a density that is greater than a density of the body of the mirror.

In accordance with a further embodiment, the invention provides a method of damping vibrations in a scanning system that includes a limited rotation motor including a rotor shaft, and includes a mirror that is coupled to the rotor shaft. The method includes the steps of rotating the minor about an axis of mirror rotation through application of a torque applied to the mirror by the limited rotation motor via the rotor shaft; and accelerating a high density material within the mirror due to vibrations in the movement of the mirror, whereby the acceleration of the high density material within the mirror absorbs energy from the vibrations thereby damping vibrations in the scanning system.

BRIEF DESCRIPTION OF THE DRAWINGS

The following description may be further understood with reference to the accompanying drawings in which.

The drawings are shown for illustrative purposes only.

DETAILED DESCRIPTION OF THE ILLUSTRATED EMBODIMENTS

During the manufacture of commercial mirrors, and in particular large mirrors, significant part-to-part variations in the center of mass of each mirror may occur. Such inconsistencies in the centering of mirror mass with respect to the axis of rotation, cause off-axis vibrations.

It has been discovered that off-axis vibrations may be damped such that their effective vibration amplitude is a factor of 5 smaller than that of an un-damped identical mirror. For example, because settling time is the inverse of bandwidth, a damped vibration period of $5 \times 10^{-3}$ seconds has a smaller amplitude than the corresponding un-damped amplitude at $2.5 \times 10^{-2}$ seconds, allowing 5 times faster settling or 5 times greater bandwidth.

Figure 1:
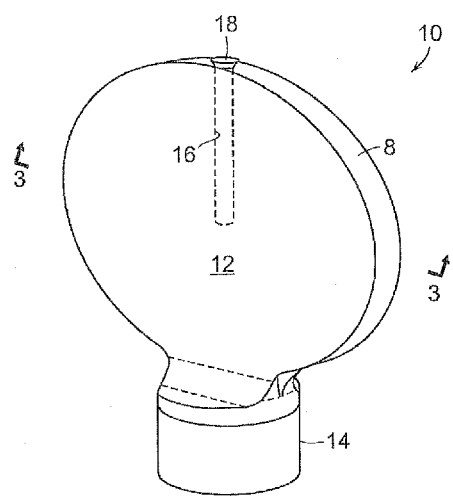
FIG. 1 shows an illustrative diagrammatic view of a minor in accordance with an embodiment of the invention.
Figure 2:
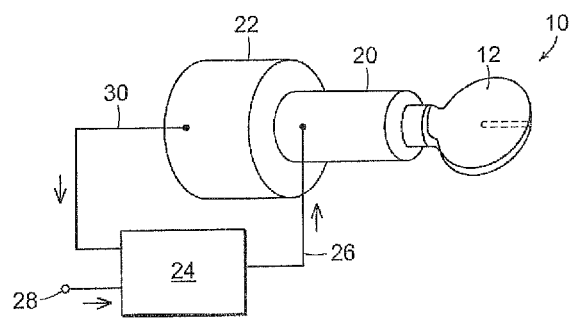
FIG. 2 shows an illustrative diagrammatic view of a limited rotation motor system employing the mirror of FIG. 1.

As shown in FIG. 1, a damped mirror 10 in accordance with an embodiment of the invention includes a reflective surface 12 and a mounting base 14 for coupling to a limited rotation motor system (as further shown in FIG. 2). The mirror 10 also includes a cylindrical aperture 16 within the body 8 of the mirror 12, and an exposed cap 18 that seals the aperture from the environment. In accordance with various embodiments, the aperture 16 contains high density material that is permitted to move within the aperture 16 of the mirror 10.

In particular, a small diameter hole is drilled either part way or most of the length of the mirror along the nominal axis of rotation to form the aperture 16. The diameter of the hole, may for example, be between about 100 microns and about 5000 microns, and preferably may be between about 500 and 2000 microns, and more preferably may be about 1000 microns. This aperture 16 is filled loosely with high-density particles, preferably made of Tungsten, Depleted Uranium, Molybdenum, Lead, Bismuth, or similar high density material. In certain embodiments, the high-density particles may have a density of greater than about 9.0 g/cm$^3$, and in further embodiments, the high density particles may have a density of greater than about 12.0 g/cm$^3$ The exposed end of the aperture 16 is then closed by the cap 18 to retain the high density material.

As shown in FIG. 2, a scanner assembly including a scanner motor 20 having a rotatable rotor coupled to a shaft on which is mounted the mirror 10. The scanner assembly also includes a transducer 22 for monitoring the position of the shaft attached to one end of the rotor. The mirror 10 and the position transducer 22 may each be attached to the rotor at the same end thereof. The system also includes a feedback control system 24 that provides a command signal 26 to the motor 22 responsive to an input command signal from an input node 28 and a feedback signal 30 from the position transducer 22 to control the speed and/or position of the motor. The mirror 10 may be coupled to the motor shaft via any of a variety of conventional techniques known to those skilled in the art.

When the mirror is driven so as to cause a laser beam that is reflected by the surface 12 toward a work-surface to move from a first position (e.g., point A on the work-surface) to a second position (e.g., point B on the work-surface), the motor must first overcome the inertia of the mirror (e.g., from a stand still), rotate the mirror very quickly, and then stop the movement of the mirror very quickly at the second position so that laser processing at point B may begin Manufacturing variations and imperfections in the mirrors may cause resonances to occur at various frequencies that may cause the positioning of the laser to be compromised.

Figure 3:
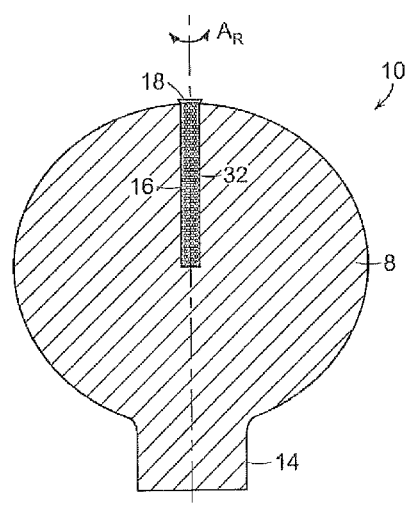
FIG. 3 shows an illustrative diagrammatic sectional view of the mirror of FIG. 1 taken along line 3-3 thereof.

With reference to FIG. 3, which is a cross-sectional view of the mirror of FIG. 1 taken along line 3-3 thereof, the aperture may be filled with damping material comprising high density particles 32, of for example, Tungsten, Depleted Uranium, Molybdenum, Lead and Bismuth, and having a particle size of about 0.1 micron to about 100 microns, and preferably from about 1 micron to 10 microns, and more preferably about 3 microns. The body 8 of the mirror 10, on the other hand, may be formed of one or more low density materials such as any of aluminum, steel, glass, semiconductor material such as silicon and/or germanium, carbon, titanium and beryllium as well as combinations thereof. In certain embodiments, the low density body material may have a density of less than about 9.0 g/cm$^3$, and in further embodiments, the low density body material may have a density of less than about 5 g/cm$^3$.

Figure 4A:
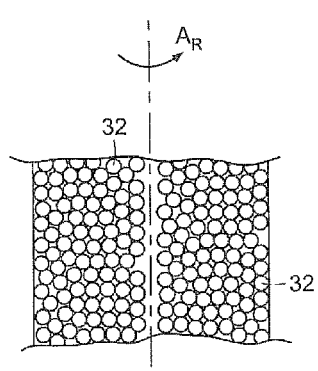
FIGS. 4A and 4B show illustrative diagrammatic enlarged cross-sectional views of a portion of the mirror of FIG. 1 prior to and after a torque motion is applied to the mirror.
Figure 4B:
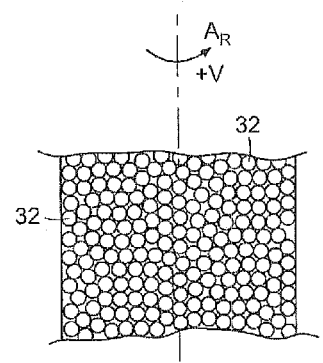

Because the damping material is at or very near the center of rotation of the mirror ($A_R$), it adds little inertia in spite of its high density. During acceleration of the mirror by the motor, the damping material is shifted away from the center of rotation by centrifugal reaction. When there is no vibration, the material 32 should pack along the walls of the hole 16 in a stable uniform layer, leaving a small area gap along the axis of rotation as shown in FIG. 4A. In the presence of vibration however, the shape of the mirror is deformed at the frequency of the vibration, and the deformation of the walls of the hole accelerates the material 32 into itself and into the walls at a high rate of speed as shown in FIG. 4B. The kinetic energy of the vibration is therefore converted into kinetic energy of the damping material, which is then converted to heat in the collisions. By conservation of energy, since energy is removed from the vibration, the vibration is reduced in amplitude.

Figure 5:
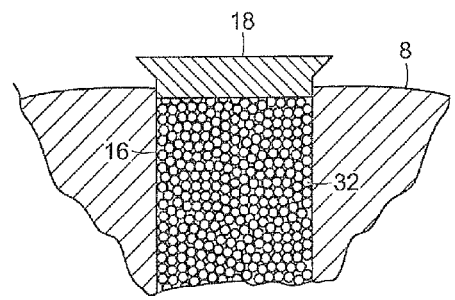
FIG. 5 shows an illustrative diagrammatic enlarged cross-sectional view of the top portion of the mirror of FIG. 1.

As shown in FIG. 5, the aperture 16 may be filled with the particles 32 such that little or no space exists between the particles 32 and the inner surface of the end cap 18. In an embodiment, the particles 32 may be packed into the aperture or may settle into the aperture by subjecting the entire mirror 10 to ultrasonic vibration. This prevents the high density material from undergoing too much movement during use that might alter the center of mass of the mirror, which may cause significant imbalances and therefore vibrations.

Figure 6:
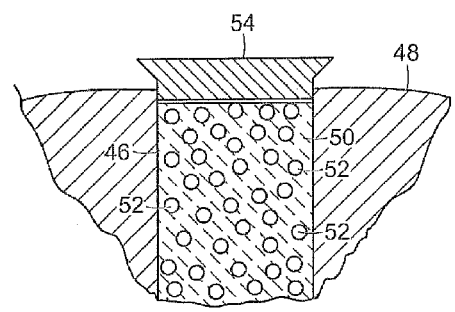
FIG. 6 shows an illustrative diagrammatic enlarged cross-sectional view of a top portion of a mirror in accordance with another embodiment of the invention.

With reference to FIG. 6, in accordance with another embodiment of the invention, an aperture 46 in a body 48 of a mirror may be filed with high-density particulates 50 (such as for example, any of Tungsten, Depleted Uranium, Molybdenum, Lead and Bismuth, and having a particle size of about 0.1 micron to about 100 microns, and preferably from about 1 microns to 5 microns) that are mixed within an elastomeric material 52 and retained by a cap 54. The chosen elastomeric material 52 (such as for example, any common elastomeric material such as rubber, silicone, viton, polyurethane and the like serves to retain the particles and acts as a spring to tune the response of the damper to a desired frequency or range of frequencies. In other words, through appropriate selection of an elastomeric material, the mirror may be designed to reduce vibrations at a particular frequency or range of frequencies due to the movement of the particles being limited by the elastomeric material.

Figure 7:
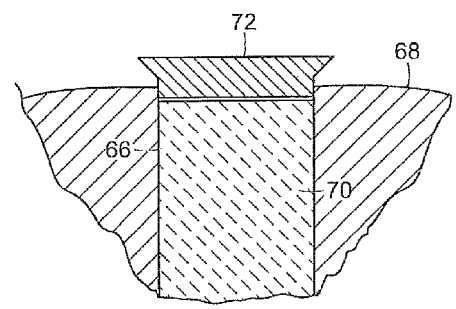
FIG. 7 shows an illustrative diagrammatic enlarged cross-sectional view of a top portion of a mirror in accordance with a further embodiment of the invention.

With reference to FIG. 7, in accordance with a further embodiment, an aperture 66 within a mirror 68 may includes a high-density fluid 70 (such as Mercury), which dissipates the energy as heat in friction with itself and with the walls. In certain embodiments, the high-density fluid may have a density of greater than about 9.0 g/cm$^3$, and in further embodiments, the high-density fluid may have a density of greater than about 12.0 g/cm$^3$. Again, a cap 72 seals the high density fluid within the aperture such that only a small amount of movement is permitted.

FIGS. 8A-8D show diagrammatic views of illustrative target processing variations from an intended target at x=0, y=0 for four scanning step sizes ($d_1$, $d_2$, $d_3$, $d_4$) using a system of the prior art comprised of a pair of mirror-galvanometer-servo systems arranged mutually at 90 degrees to each other so that one system moves the laser beam in the x direction while the other moves the laser beam in the y direction. These scatter plots show a multiplicity of attempts at achieving a step-wise motion from point A to point B (x=0, y=0), point B being shown in each of the charts. The distance from point A to point B is the variable, increasing in each step d0 to d1 to d2 to d3 to d4. The overall size of the scatter map in the x and the y directions respectively is a measure of the error of the system in achieving the desired motion between point A and point B.

The accelerating current impulse at time $t_1$ causes a vibration in both systems, as discussed in more detail below. In the damped system, the vibration dies out before the reverse direction acceleration pulse is applied (as discussed further below with reference to FIG. 13). Conversely, in the undamped system the vibration persists (as discussed further below with reference to FIG. 14). When the reverse direction impulse is applied to the un-damped system the impulse adds geometrically with the phase of the original vibration, and is in principle unlimited in amplitude. The new amplitude is approximately 10 times the original amplitude, and under these conditions will persist at an obnoxious amplitude for many milliseconds after the end of the position change command pulse.

Figure 8A:
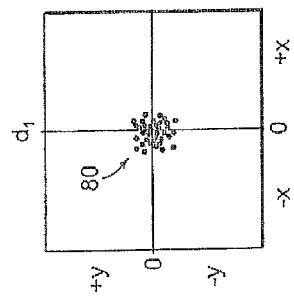
FIGS. 8A-D show illustrative diagrammatic views of target processing variations from an intended target for four scanning step sizes using a system without damping.
Figure 8B:
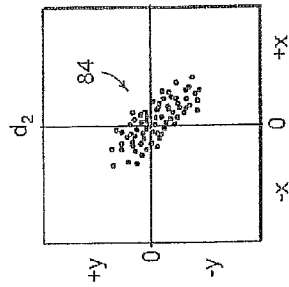
Figure 8C:
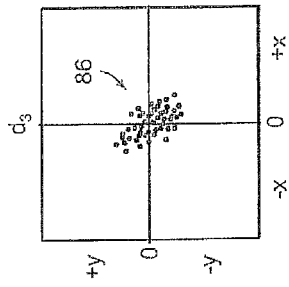
Figure 8D:
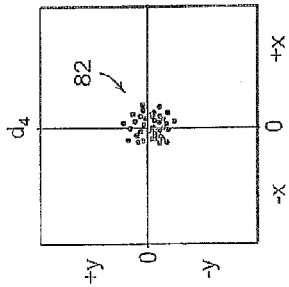
Figure 9A:
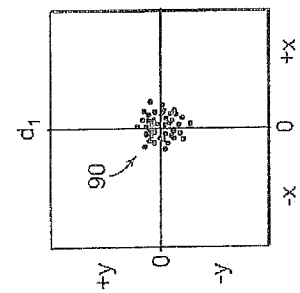
FIGS. 9A-9D show illustrative diagrammatic views of target processing variations from the same intended target as in FIGS. 8A-8D for four scanning step sizes using a system in accordance with an embodiment of the invention.
Figure 9B:
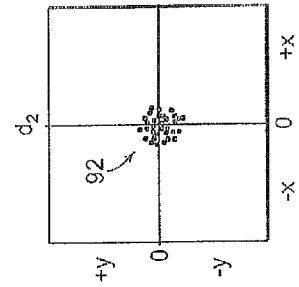
Figure 9C:
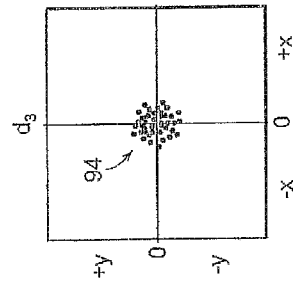
Figure 9D:
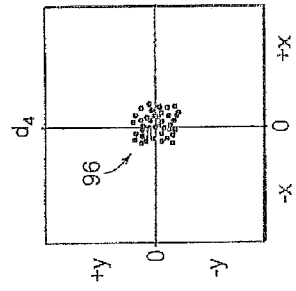

The effect of this phase dependence is seen in FIGS. 8A through 8D where the arbitrarily chosen distances between point A and point B each have a different phase difference between that vibration initiated at time $t_1$ and that vibration initiated at time $t_3$, with the result that the smallest step d0-d1 in FIG. 8A and the largest step d3-d4 in FIG. 8D both have phase differences near 180 degrees, so that the vibration from the second impulse nearly cancels the vibration from the first impulse, with the result that the amplitude of the scatter is small and acceptable, while both intermediate distance steps d1-d2 (FIG. 5B) and d2-d3 (FIG. 8C) have phase differences close to zero, and so the vibrations resulting from the impulses at time $t_1$ and time $t_3$ add together in amplitude, increasing the amplitude of the scatter substantially.

As may be seen in FIGS. 9A through 9D, which are scatter plots of the same system with a damped identical mirror performing identical steps, the result of the damping is to produce approximately the same size scatter plots for all the steps, regardless of the phase of the vibrations. Since it is impractical to predict the phase of the vibrations resulting from a particular step size with a particular system, the damping particle size may be chosen to provide damping within a range suitable to damp the entire vibration spectrum of interest.

The illustrations of FIGS. 8A-8D and 9A-9D are intended to show that using the same imperfect mirror, both with (FIGS. 9A-9D) and without the additional high density material (FIGS. 8A-8D), improvements may be obtained in target processing for all step sizes $d_1$, $d_2$, $d_3$, and $d_4$. These drawings are shown for illustrative purposes only.

Figure 10:
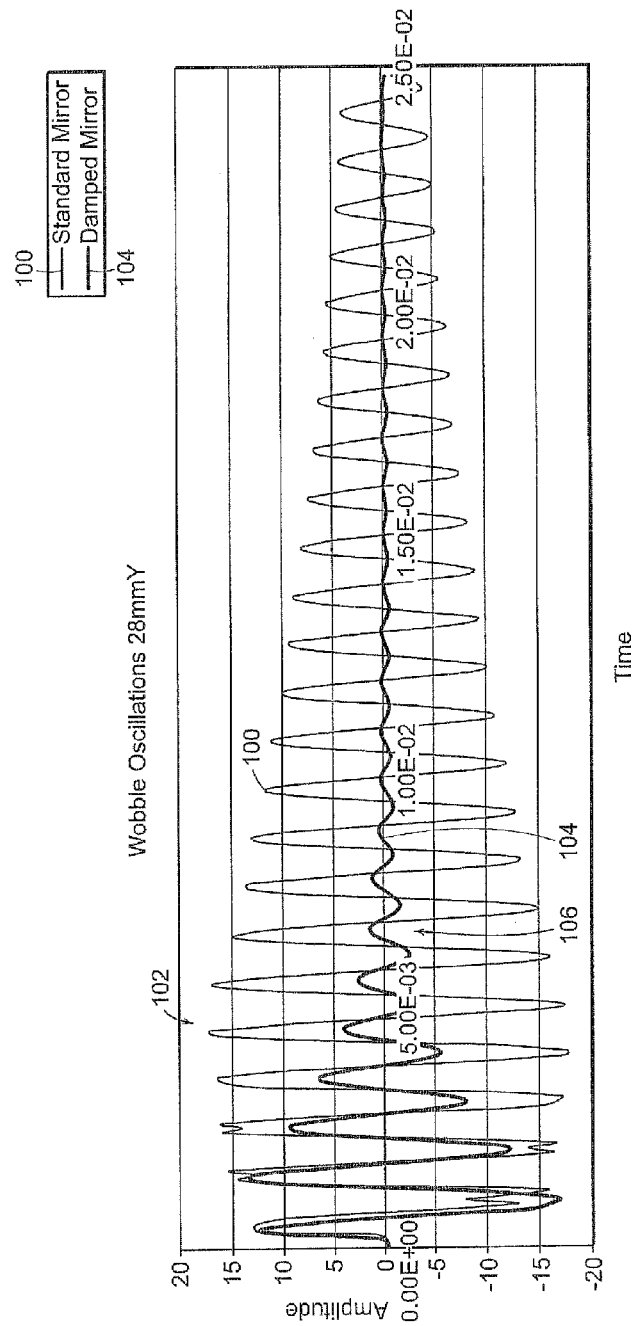
FIG. 10 shows an illustrative graphical representation of wobble oscillations in a mirror of the prior art following a non-zero acceleration, as well as comparative wobble oscillations in a mirror in accordance with an embodiment of the invention.

FIG. 10 shows an illustrative view of wobble oscillations in a prior art mirror as well as a mirror in accordance with an embodiment of the invention. As shown at 100, a prior art mirror oscillates significantly for more than 0.25 seconds ($2.5 \times 10^{-2}$), and in fact experiences the greatest amplitude of oscillation (as shown at 102) after the motor has stopped (at 0.00). As shown at 104, a mirror in accordance with an embodiment of the invention begins to reduce the amplitude of oscillations immediately after the motor stops (at 0.00), and significantly reduces the oscillations after only 0.01 seconds ($1.00 \times 10^{-2}$) as shown at 106. The damped response of a system of the invention, therefore, never reaches the peak amplitude of motion of the un-damped system, and further by $5 \times 10^{-3}$ seconds after the end of command the vibration is already below that of the un-damped system at $2.5 \times 10^{-2}$ seconds, providing a gain of a factor of 5 in settling time.

Figure 11:
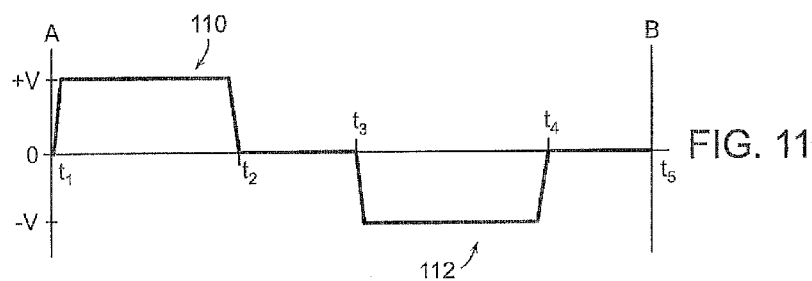
FIG. 11 shows an illustrative graphical representation of a voltage applied to a limited rotation motor to move a mirror from point A to point B.
Figure 12:
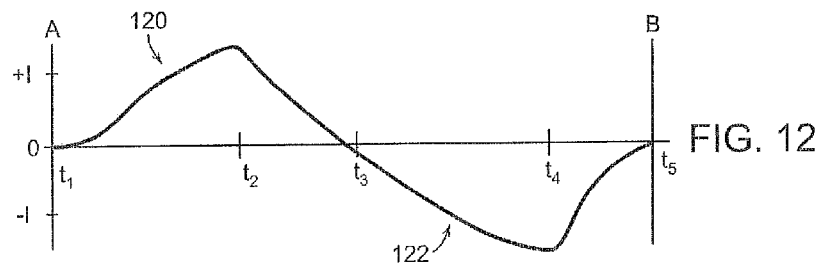
FIG. 12 shows an illustrative graphical representation of the associated current in stator windings in a limited rotation motor responsive to the voltage of FIG. 11.
Figure 13:
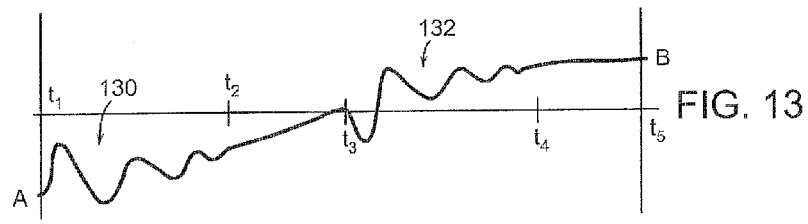
FIG. 13 shows an illustrative graphical representation of a response of a limited rotation motor system using a damped mirror in accordance with an embodiment of the invention.
Figure 14:
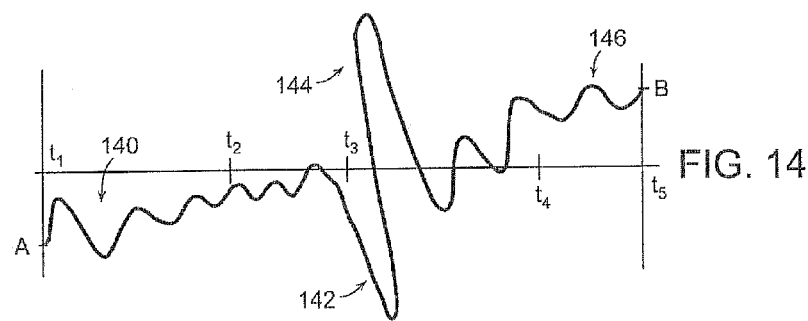
FIG. 14 shows an illustrative graphical representation of a response of a limited rotation motor system using an un-damped mirror.

With reference to FIGS. 11-14, the movement of the mirror due to a control signal to that drives a mirror from a first position (providing a first laser point A) to a second position (providing a second laser point B) is as follows. Generally, FIG. 14 shows movement vibrations of an un-damped mirror on a time scale common with the voltage across the motor, (as shown in FIG. 11), current through the motor, (as shown in FIG. 12). FIG. 13 shows the damped response of the system on the same time scale. The accelerating current impulse at time $t_1$ causes a vibration in both systems as shown in FIGS. 13 and 14. In the damped system (FIG. 13), the vibration dies out before the reverse direction acceleration pulse is applied as shown in FIG. 13. Conversely, in the un-damped system, the vibration persists as shown in FIG. 14.

In particular, FIG. 13 shows that a voltage to a stator of a limited rotation motor is initially increased to a +v voltage and the voltage potential on the stator quickly ramps up to this voltage during time $t_1$ to $t_2$ as shown at 110. The voltage is then ceased at time $t_2$, and then at time $t_3$, a negative voltage is applied to stop the rotor as shown at 112. Similarly, the current ramps up from time $t_1$ to time $t_2$ as shown at 120, then falls off until time $t_3$. From time $t_3$ to time $t_4$, a negative current is applied to stop the movement of the mirror as shown at 122. The current then again falls off until time $t_5$ when the mirror stops.

As shown in FIG. 13, the movement of a damped mirror in accordance with an embodiment of the invention has some initial oscillations (as shown at 130) when the positive current is first applied at time $t_1$, but these oscillations quickly die out long before the negative current (reverse direction acceleration pulse) is applied at time $t_3$. Again, when the negative current is first applied at time $t_3$, the mirror has some initial oscillations (as shown at 132) that quickly die out long before the mirror reaches the desired position at time $t_5$. Conversely and as shown in FIG. 14, when using an un-damped mirror, the mirror has some initial oscillations (as shown at 140) when the positive current is first applied at time $t_1$, but these oscillations do not die out prior to time t3, at which point they are amplified (as shown at 142 and 144). Although these oscillations do reduce prior to time $t_5$, some oscillations remain (as shown at 146), and these oscillations will negatively impact the accuracy of any laser processing that occurs at time $t_5$. When the reverse direction impulse is applied to the un-damped system the impulse adds geometrically with the phase of the original vibration, and is in principle unlimited in amplitude. As shown in FIG. 14 the new amplitude is approximately 10 times the original amplitude, and under these conditions the vibration will persist at an obnoxious amplitude for many milliseconds after the end of the position change command pulse.

The effect of this phase dependence is seen in FIGS. 8A through 8D where the arbitrarily chosen distances between point A and point B each have a different phase difference between them in connection with which a vibration was initiated at time $t_1$ and a further vibration was initiated at time $t_3$, with the result that the smallest step d0-d1 in FIG. 8A and the largest step d3-d4 in FIG. 8D both have phase differences near 180 degrees, so that the vibration from the second impulse nearly cancels the vibration from the first impulse, while both intermediate distance steps d1-d2 (FIG. 8B) and d2-d3 (FIG. 8C) have phase differences close to zero, and so the vibrations resulting from the impulses at time $t_1$ and time $t_3$ add together in amplitude.

Those skilled in the art will appreciate that numerous modifications and variations may be made to the above disclosed embodiments without departing from the spirit and scope of the invention.

What is claimed is:

1. A mirror for use in a limited rotation motor system, said mirror comprising:
    a body formed of at least one material and having an exposed mirror surface, said body being mountable with the limited rotation motor system for rotation with respect to an axis of mirror rotation;
    an aperture within the body of the mirror, said aperture being at least proximate to a portion of said axis of mirror rotation; and
    a high density material within said aperture and capable of movement within said aperture with respect to the body of the mirror, said high density material having a density that is greater than a density of the at least one material of the body of the mirror.

2. The mirror as claimed in claim 1, wherein said high density material is provided as particles of a solid material.

3. The mirror as claimed in claim 2, wherein said particles are provided within an elastomeric material within said aperture.

4. The mirror as claimed in claim 2, wherein said particles each have a size between about 1 micron and about 5 microns.

5. The mirror as claimed in claim 2, wherein said high density material is formed of any of tungsten, depleted uranium, molybdenum, lead and bismuth.

6. The mirror as claimed in claim 1, wherein said high density material is provided as a fluid.

7. The mirror as claimed in claim 1, wherein said fluid is mercury.

8. The mirror as claimed in claim 1, wherein said aperture is substantially coincident with at least a portion of the axis of mirror rotation.

9. A scanning system including a limited rotation motor coupled to a mirror, said limited rotation motor comprising a rotor shaft and said mirror comprising:
    a body having an exposed mirror surface and being coupled to the rotor shaft of the limited rotation motor system for rotation with respect to an axis of mirror rotation;
    a high density material within an aperture in the body of the mirror, said high density material being capable of movement within said aperture with respect to the body of the mirror, and said high density material having a density that is greater than a density of the body of the mirror.

10. The scanning system as claimed in claim 9, wherein said high density material is provided as particles of a solid material.

11. The scanning system as claimed in claim 10, wherein said particles are provided within an elastomeric material within said aperture.

12. The scanning system as claimed in claim 10, wherein said particles each have a size between about 1 micron and about 5 microns.

13. The scanning system as claimed in claim 10, wherein said high density material is formed of any of tungsten, depleted uranium, molybdenum, lead and bismuth.

14. The scanning system as claimed in claim 9, wherein said high density material is provided as a fluid.

15. The scanning system as claimed in claim 9, wherein said fluid is mercury.

16. The scanning system as claimed in claim 9, wherein said aperture is substantially coincident with at least a portion of the axis of mirror rotation.

17. A method of damping vibrations in a scanning system that includes a limited rotation motor including a rotor shaft, and a mirror coupled to the rotor shaft of the limited rotation motor, said method comprising the steps of:
    rotating the mirror about an axis of mirror rotation through application of a torque applied to the mirror by the limited rotation motor via the rotor shaft; and
    accelerating a high density material within the mirror due to vibrations in the movement of the minor, whereby the acceleration of the high density material within the mirror absorbs energy from the vibrations thereby damping vibrations in the scanning system.

18. The method as claimed in claim 17, wherein said high density material is provided as particles of a solid material.

19. The method as claimed in claim 18, wherein said particles each have a size between about 1 micron and about 5 microns.

20. The method as claimed in claim 17, wherein said high density material is formed of any of tungsten, depleted uranium, molybdenum, lead and bismuth.

* * * * *

UNITED STATES PATENT AND TRADEMARK OFFICE
CERTIFICATE OF CORRECTION

PATENT NO. : 8,284,470 B2  
APPLICATION NO. : 12/764392  
DATED : October 9, 2012  
INVENTOR(S) : David C. Brown et al.

Page 1 of 1

It is certified that error appears in the above-identified patent and that said Letters Patent is hereby corrected as shown below:

In Column 2, line 9, delete "minor" and replace with "mirror"

In Column 2, line 18, delete "minor" and replace with "mirror"

In Column 2, line 31, delete "minor" and replace with "mirror"

Signed and Sealed this  
Fourth Day of December, 2012

David J. Kappos  
*Director of the United States Patent and Trademark Office*